United States Patent
Williams

(10) Patent No.: US 7,006,586 B2
(45) Date of Patent: Feb. 28, 2006

(54) CYCLIC BUFFER FOR INFRARED

(75) Inventor: Kalvin Williams, Thatcham (GB)

(73) Assignee: LSI Logic Corporation, Milpits, CA (US)

(*) Notice: Subject to any disclaimer, the term of this patent is extended or adjusted under 35 U.S.C. 154(b) by 866 days.

(21) Appl. No.: 09/862,261

(22) Filed: May 21, 2001

(65) Prior Publication Data

US 2002/0097667 A1   Jul. 25, 2002

(51) Int. Cl.
H03D 1/00 (2006.01)

(52) U.S. Cl. .................................................. 375/340

(58) Field of Classification Search ............. 375/340, 375/316, 239, 242; 710/20, 21, 22, 33, 35; 725/132; 370/205, 419

See application file for complete search history.

(56) References Cited

U.S. PATENT DOCUMENTS

| | | | | |
|---|---|---|---|---|
| 5,325,398 A | * | 6/1994 | Murakami et al. | 375/237 |
| 5,870,380 A | | 2/1999 | Diehl et al. | 370/212 |
| 5,971,397 A | * | 10/1999 | Miguel et al. | 273/371 |
| 6,367,080 B1 | * | 4/2002 | Enomoto et al. | 725/112 |
| 6,411,397 B1 | * | 6/2002 | Petteruti et al. | 358/1.18 |
| 2004/0268136 A1 | * | 12/2004 | Mitsuishi | 713/189 |

FOREIGN PATENT DOCUMENTS

EP            0525667           3/1993

* cited by examiner

Primary Examiner—Khai Tran
(74) Attorney, Agent, or Firm—Christopher P. Maiorana, P.C.

(57) ABSTRACT

An apparatus for receiving and processing an electrical signal in the form of a pulse train comprising a plurality of pulses. The apparatus generally comprises a processor, a memory and a timer. The timer may be configured to generate a respective value representative of the positions of each leading and trailing edge of each pulse in the pulse train. The memory may be configured to receive the value and write the value. The timer may be configured to generate an interrupt signal following receipt of the trailing edge of the last pulse in the pulse train and apply the interrupt signal to the processor. The processor may read the values stored in the memory for decoding the pulse train in response to said interrupt signal.

20 Claims, 4 Drawing Sheets

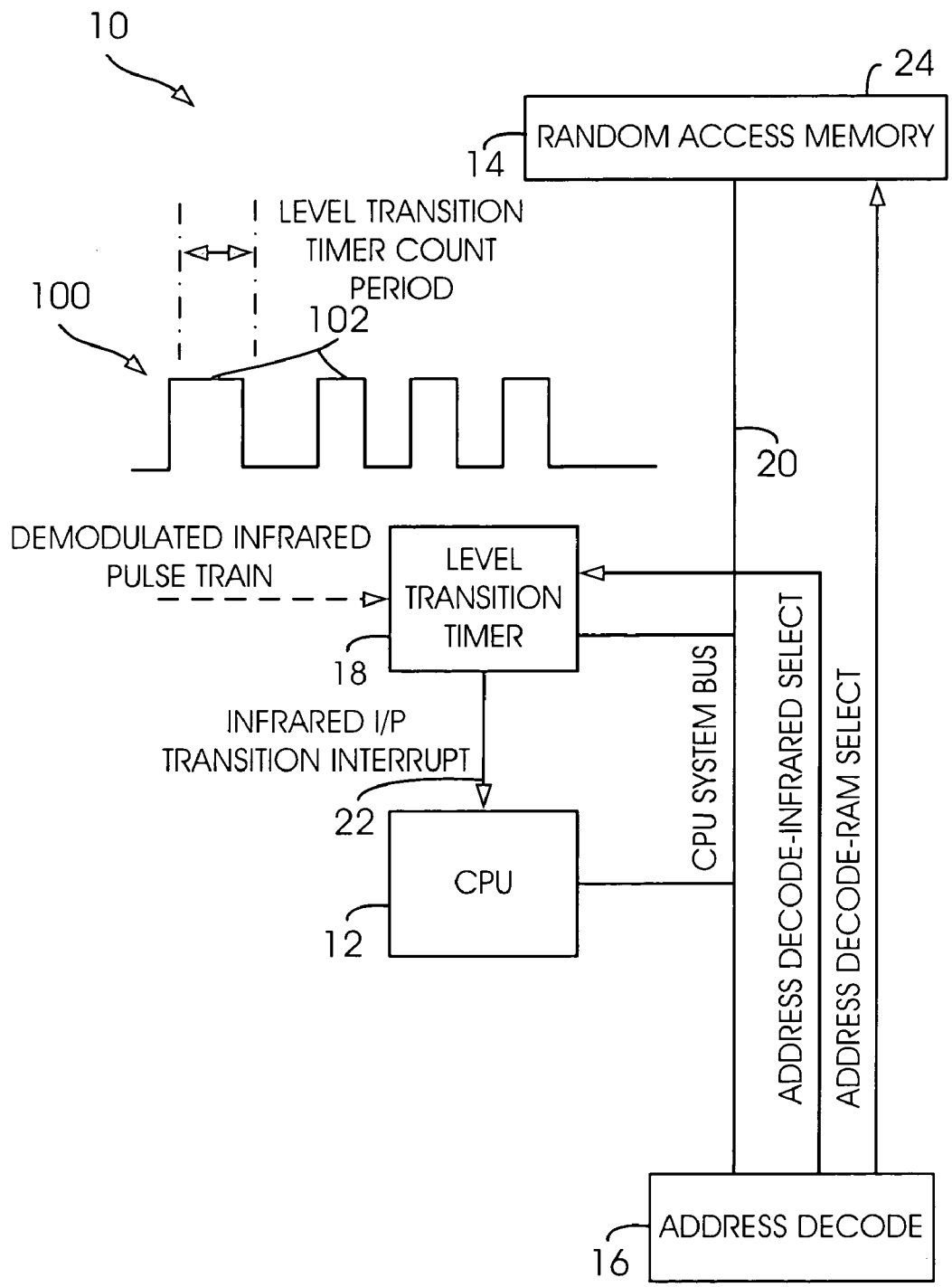
(CONVENTIONAL)
FIG. 1

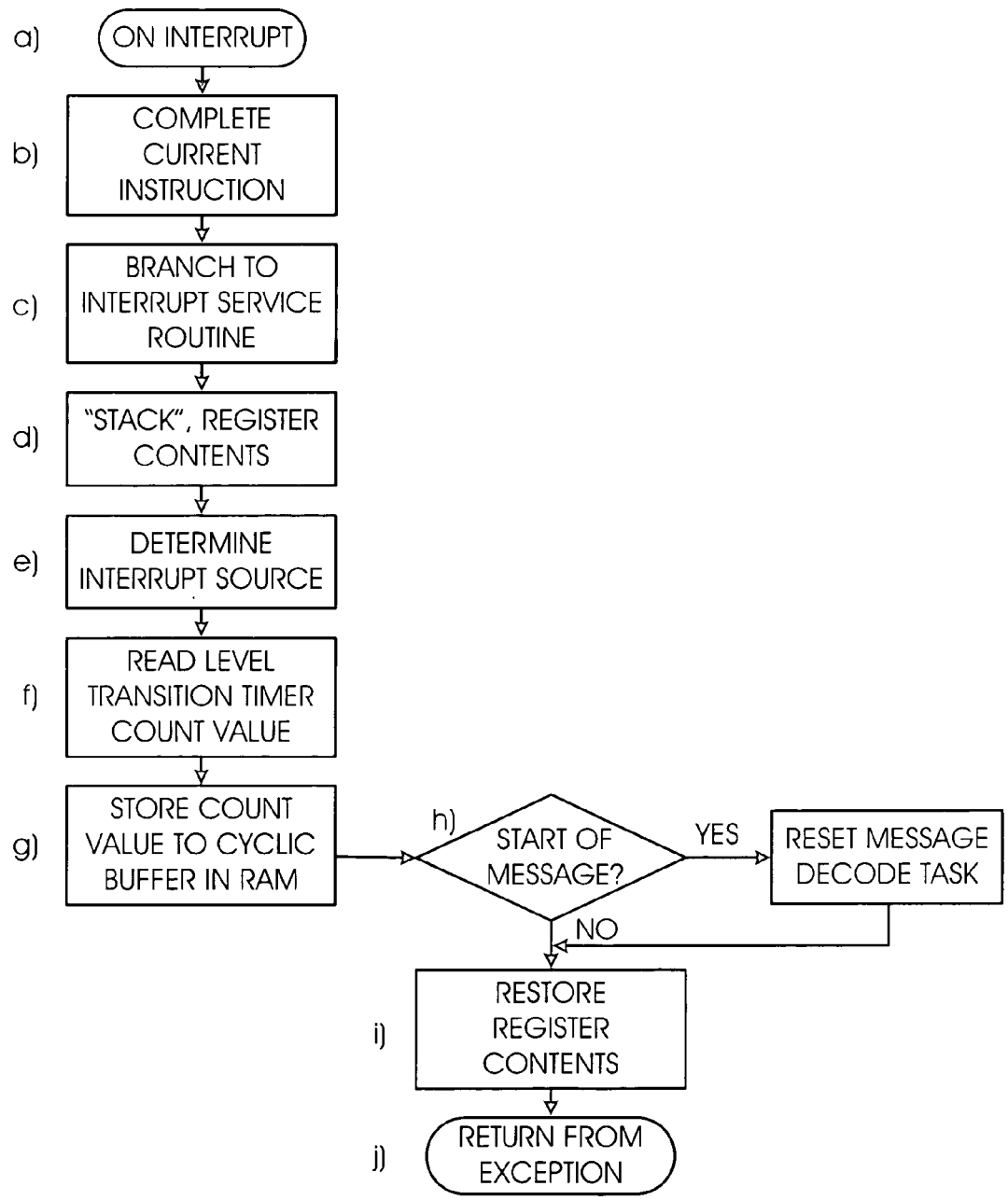
(CONVENTIONAL)
FIG. 2

CYCLIC BUFFER FOR INFRARED

This application claims the benefit of United Kingdom Application No. 0101520.5 filed Jan. 20, 2001.

FIELD OF THE INVENTION

The present invention relates to a method and/or apparatus for receiving and decoding infrared signals generally and, more particularly, a method and/or apparatus receiving and decoding infrared signals generated by an infrared remote control unit, where the signals are defined by a pulse train and the signal coding is represented by variations in the width of the pulses in the train.

BACKGROUND OF THE INVENTION

Conventional remote control units such as those for controlling digital televisions, set top boxes or video recorders, generate infrared (IR) or radio frequency (RF) signals comprising serial binary pulse trains where the signal coding is represented by variations in pulse width. When a given button on the remote control unit is pressed to instruct the device to perform a particular function, the remote control unit generates and transmits a serial binary pulse train signal. The variations in the width of the pulses in the signal are a form of code defining the particular instruction. Thus, a signal defining an instruction to increase volume would have different pulse width variations than a signal defining an instruction to change channels. In conventional decoders, control of the storage of values representing each pulse width and position in the pulse train is given to a main processor which has to stop normal processing operations to store the pulse values.

Referring to FIG. 1, a conventional decoder unit 10 such as that found in a digital set top box is shown. The decoder unit 10 includes a system processor or CPU 12, a random access memory (RAM) 14, an address decoder unit 16 and a level transition timer (LTT) 18. The CPU 12, RAM 14, address decoder 16 and LTT 18 all communicate through a system bus 20. The LTT 18 is additionally connected directly to the CPU 12 via an interrupt line 22. The LTT 18 is arranged to receive the pulse train signal transmitted by the remote control unit (not shown).

In practice the actual signal transmitted by the remote control unit consists of the pulse train signal modulated onto a carrier signal. The transmitted signal is initially received by a demodulator unit (not shown) which demodulates the signal in order to extract the pulse train. The pulse train is then applied to the LTT 18 in a form such as that shown generally at 100 having a series of pulses 102 whose width varies in a predetermined manner depending on the instruction that the signal is intended to represent.

In order to decode the pulse train signal transmitted by the remote control unit, the decoder unit 10 must determine the width of each pulse in the signal. This is normally achieved by monitoring the time of each change of state in the pulse train. Such changes of state occur at the start and end of each pulse where the level of the signal changes from 0 to 1 or 1 to 0 and are referred to as "level transitions" or "pulse edges". Each pulse edge triggers the generation of a counter value in the LTT 18 indicating either the time elapsed from the last detected pulse edge or the absolute time of the pulse edge from the start of the pulse train signal depending on the system used. As the time of each pulse edge is captured by the LTT 18 and the counter value is generated, the LTT 18 applies an interrupt signal to the CPU 12 via the interrupt signal line 22. This causes the CPU 12 to suspend carrying out its current task (e.g., processing the received television signal) and begin an interrupt service routine (ISR). The ISR involves the CPU 12 performing a number of tasks as illustrated in the flow diagram of FIG. 2.

On receipt of the interrupt signal from the LTT 18 on line 22 (step a) the CPU 12 completes any current or pending instruction or task being performed (step b) and then suspends the carrying out of any further tasks and branches to the ISR (step c). The CPU 12 copies the contents of any registers containing system or program data used by the CPU 12 for its previous tasks to a portion of memory (e.g., RAM 14) in a process known as "stacking" (step d). The stacking provides register space for any data required by the CPU 12 for carrying out the ISR. The CPU 12 then interrogates the system hardware to determine the source of the interrupt signal (step e). When the CPU 12 determines the LTT 18 is the source of the interrupt signal, the CPU 12 reads the counter value for the last pulse edge (step f) and writes this value to a cyclic buffer 24 in the RAM 14 via the address decoder 16 and system bus 20 (step g). The CPU 12 checks whether the last pulse edge defines the start of a new instruction (step h) and if it does not, the CPU 12 then restores its register contents by reading the original system data from the stack 24 and writing the data back into the CPU registers (step i). When the register contents have been restored, the CPU returns from the ISR to process normal tasks until the next interrupt signal is received (step j).

This process is repeated for each pulse edge or level transition in the pulse train. Once all of the pulses in the pulse train have been received and the counter values for each pulse edge have been written to the cyclic buffer in the RAM 14, the CPU 12 reads the sequence of counter values from the cyclic buffer 24 for decoding. The sequence of counter values in the cyclic buffer 24 represents either the absolute times of the pulse edges or the time elapsed between each pulse edge and thus constitutes a code defining a specific instruction. The CPU 12 then either applies the code to a separate decoding unit which decodes the signal and returns the appropriate instruction or, more usually, decodes the instructions itself.

An interrupt signal is generated by the LTT 18 on every pulse edge of the pulse train signal. The CPU 12 is required to execute an ISR at each pulse edge. Since individual pulse trains often contain in excess of 10 pulses (20 level transitions) and occasionally up to and above 100 pulses (200 level transitions), significant system latency is associated with receiving and decoding such signals. Such a latency (measured in number of processor cycles) can be estimated as:

step d (stack register contents) 50 cycles;

step e (determine interrupt source) 25 cycles;

step f (read counter value) 5 cycles;

step i (restore register contents) 50 cycles.

Thus, the executing of each ISR delays the CPU 12 from continuing with its normal tasks for approximately 135 processor cycles, which is a considerable portion of the instantaneous processing power provided by the CPU 12. The reception and decoding of the pulse train could prevent the CPU 12 from adequately performing normal tasks.

It would be advantageous to provide a method and/or apparatus for receiving and decoding a demodulated pulse train which reduces the burden on the system processor within the decoder unit.

SUMMARY OF THE INVENTION

One aspect of the present invention provides an apparatus for receiving and processing an electrical signal in the form of a pulse train comprising a plurality of pulses. The apparatus generally comprises a processor, a memory and a timer. The timer may be configured to generate a respective value representative of the positions of each leading and trailing edge of each pulse in the pulse train. The memory may be configured to receive the value and write the value. The timer may be configured to generate an interrupt signal following receipt of the trailing edge of the last pulse in the pulse train and apply the interrupt signal to the processor. The processor may read the values stored in the memory for decoding the pulse train in response to said interrupt signal.

Another aspect of the present invention may provide a method of processing an electrical signal in the form of a train of pulses comprising the steps of (A) generating a value representative of the positions of the leading and trailing edges of each pulse in the pulse train, (B) writing each value to a memory without intervention from an associated processor, (C) generating a final value representative of the position of the trailing edge of the last pulse in the pulse train, (D) generating an interrupt signal following receipt of the last pulse and applying the interrupt signal to the processor and (E) reading each value from the memory thereby to decode the pulse train.

BRIEF DESCRIPTION OF THE DRAWINGS

These and other objects, features and advantages of the present invention will be apparent from the following detailed description and the appended claims and drawings in which:

FIG. 1 is a block diagram of a conventional decoder unit for receiving and decoding a pulse train signal from a remote control unit;

FIG. 2 is a flow diagram of an Interrupt Service Routine (ISR) executed by the decoder unit of FIG. 1;

DETAILED DESCRIPTION OF THE PREFERRED EMBODIMENTS

Figure 3:
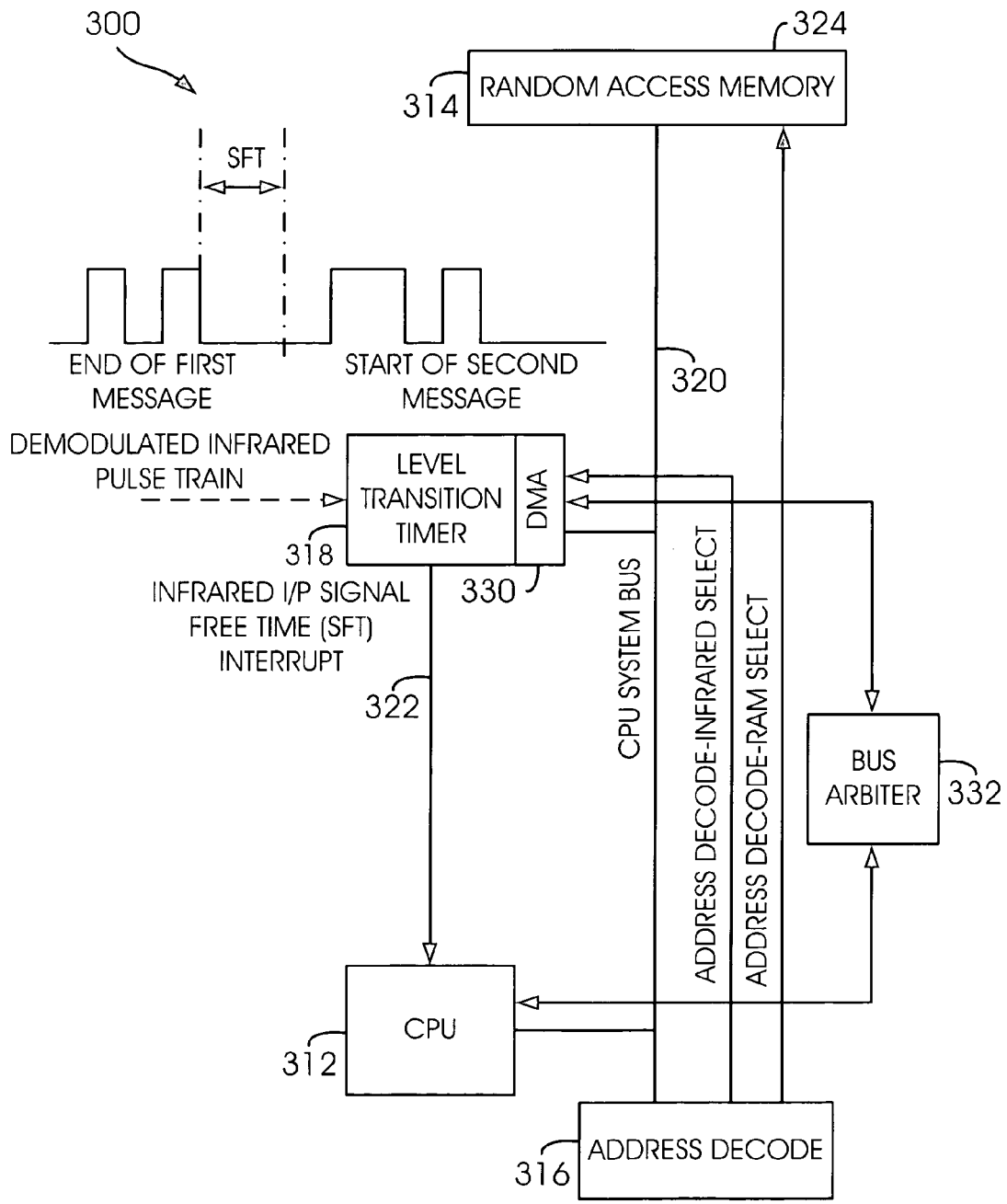
FIG. 3 is a block diagram of a preferred embodiment of the present invention.

Referring to FIG. 3, a circuit 300 for receiving and decoding a pulse train signal from a remote control unit is shown. The circuit 300 may comprise a processor in the form of a CPU 312, a random access memory (RAM) 314, an address decoder unit 316 and a counter in the form of a level transition timer (LTT) 318. The CPU 312, the RAM 314, the address decoder 316 and the LTT 318 may be connected to a system bus 320. The LTT 318 may additionally be connected to the CPU 312 via an interrupt signal line 322. However, in the apparatus of FIG. 3, the LTT 318 may be connected to the system bus 320 via a direct memory access (DMA) unit 330. The DMA unit 330 may be operable to access the RAM 314 directly (via the address decoder 316) without the intervention of the CPU 312. In addition, the circuit 100 may include a bus arbiter 332 connected to each of the DMA unit 330 and the CPU 312. The bus arbiter 332 may be operable to control access to the system bus 320 to prevent collisions between the CPU 312 and the DMA 330.

The demodulated pulse train from the demodulator (not shown) may comprise a plurality of pulses having differing widths. The pulses are generally applied to the LTT 318 which monitors the level transitions of the signal (pulse edges) and generates a counter value for each pulse edge indicative of either the absolute time of the pulse edge or the time elapsed from the previous pulse edge. In contrast with the decoder unit of FIG. 1, the LTT 318 does not issue an interrupt signal to the CPU 312 on the line 322 at each counter value but, instead, applies each counter value to the DMA 330. Under control of the bus arbiter 332, to prevent the CPU 312 and the DMA 330 from accessing the bus simultaneously, the DMA 330 may write the counter value to a cyclic buffer 324 in the RAM 314 via the address decoder 316. The message start position in the cyclic buffer may be flagged in a known manner to ensure sequential storing of the counter values.

At the end of the message, defined by an idle period of guaranteed minimum length termed the "signal free time" (SFT), the LTT 318 may generate and apply an interrupt signal to the CPU 312 via the interrupt line 322. Thus, when a predetermined time elapses following the trailing edge of a pulse in the pulse train without occurrence of a subsequent pulse as measured by the LTT 318, the interrupt signal may be generated and applied to the CPU 312.

Figure 4:
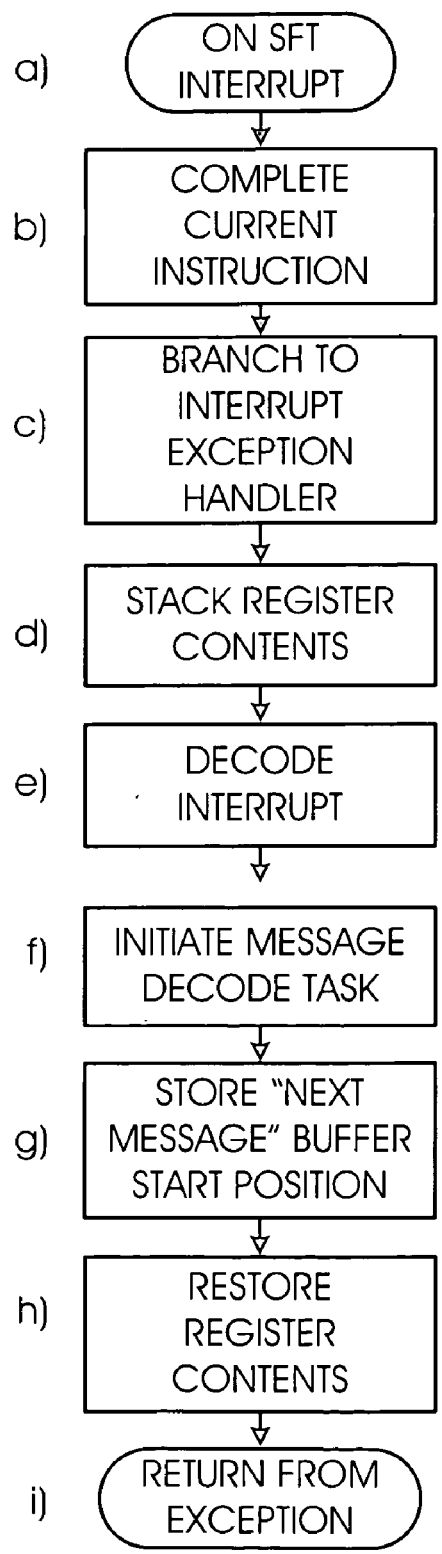
FIG. 4 is a flow diagram of the method of operation of the apparatus of FIG. 3.

On receipt of the interrupt signal from the LTT 318, the CPU 312 executes an ISR as shown in the flow diagram of FIG. 4. On receipt of the interrupt signal (step a) the CPU 312 may complete any current or pending tasks (step b) and then branch to the ISR (step c). The CPU 312 may copy any data held in the system registers to the stack (not shown) in the RAM 314 (step d) and then interrogate the system hardware to determine the source of the interrupt signal (step e). Since the interrupt signal issued by the LTT 318 may indicate to the CPU 312 that the data for a whole message is stored in the cyclic buffer 324, the CPU 312 may initiate a "message decode" task involving reading from the cyclic buffer 324 the data corresponding to the instruction and either decoding the message or applying the message to a separate decoding unit (step f).

The data stored in the cyclic buffer 324 may represent the instruction in the form of a series of counter values. The CPU 312 may then flag the start position for the next instruction in the cyclic buffer 324 to ensure sequential storage of the counter values for the next instruction (step g) and then restore the register contents to the system registers from the stack (step h). The CPU 312 may then return from the ISR to its normal task (step i).

The CPU 312 is generally only required to execute one ISR for each pulse train (instruction). The execution occurs once the entire pulse train has been received and stored in the cyclic buffer 324 by the DMA 330. The DMA 330 is typically used to automatically transfer all information (counter values) necessary for decoding the instruction to the cyclic buffer 324 within the RAM 314. Consequently, the CPU 312 may be able to proceed with normal tasks until the trailing edge of the final pulse of an instruction is received. Much of the interrupt latency is removed and the CPU 312 is freed to perform key application tasks. Using the latency estimates described in the background section, in the course of a 10 pulse instruction the CPU 312 may be required to execute only one ISR taking approximately 135 cycles. In contrast, conventional decoder units would involve the CPU 312 executing 20 ISRs lasting a total of 2700 cycles.

The CPU 312 may save more time on longer pulse trains. For example, a 100 pulse train would require the CPU 312 of the decoder in the background section to execute 200

ISRs lasting 27000 cycles, while the CPU 312 of the present invention would only need to execute one ISR at the end of the pulse train lasting 135 cycles.

It is an advantage of the present invention to allow faster infrared signals complying with more recent standards to be received and decoded removing considerable latency involved with servicing signal reception, allowing the CPU 312 to perform normal tasks more freely. The invention is not limited to infrared signals, but is also applicable for decoding demodulated RF signals.

While the invention has been particularly shown and described with reference to the preferred embodiments thereof, it will be understood by those skilled in the art that various changes in form and details may be made without departing from the spirit and scope of the invention.

The invention claimed is:

1. An apparatus for receiving and processing an electrical signal in the form of a pulse train comprising a plurality of pulses, comprising:
   - a processor;
   - a memory;
   - a first circuit configured to (i) generate a respective value representative of a position for each leading edge and each trailing edge of each pulse in the pulse train and (ii) generate an interrupt signal in response to a signal free time following a current message in the pulse train and (iii) apply said interrupt signal to said processor, wherein said processor is arranged to read the values stored in the memory for decoding said current messege in response to both (a) said interrupt signal and (b) a current start address of said current message in said memory; and
   - a second circuit configured to receive said values from said circuit and write said values to said memory.

2. The apparatus according to claim 1, wherein said second circuit comprises a direct memory access unit.

3. The apparatus according to claim 1, wherein said first circuit comprises a level transmission timer arranged to recognize said signal free time.

4. The apparatus according to claim 1, wherein said memory comprises a cyclic buffer.

5. The apparatus according to claim 1, wherein said processor is configured to flag a next start address in the memory for storage of a next value representative of the leading edge of a first pulse in a next message in response tossed interrupt signal for said current message.

6. The apparatus according to claim 1, wherein said memory, said processor and said second circuit are interconnected via a data bus.

7. The apparatus according to claim 6, wherein said apparatus further comprises:
   - a third circuit configured to control access to said data bus by said processor and said second circuit.

8. The apparatus according to claim 3, wherein said third circuit comprises a bus arbiter.

9. The apparatus according to claim 1, wherein said interrupt signal is generated based on an absence of said pulses.

10. A method of processing an electrical signal in the form of a pulse train, comprising the steps of:
    (A) generating a value representative of a position of the leading and trailing edges of each pulse in the pulse train;
    (B) writing each of said values to a memory beginning at a current start address without intervention from an associated processor;
    (C) generating a final value representative of the position of the trailing edge of a last pulse in the pulse train;
    (D) generating an interrupt signal in response to an absence of a subsequent pulse following said last pulse for a predetermined time and applying said interrupt signal to said associated processor; and
    (E) reading each of said values from said memory beginning at a current start address to decode said pulse train.

11. The method of claim 10, wherein step (A) comprises: generating a counter value representative of a time position of the each leading edge and each trailing edge of each of said pulses in the pulse train.

12. The method of claim 10, wherein step (B) comprises: applying each of said values of step (A) to a direct memory access unit which writes each of said values to a memory beginning at said current start address without intervention from the associated processor.

13. The method of claim 10, wherein step (C) comprises: monitoring an elapsed time following each of said trailing edges and, in an absence of said subsequent pulse occurring within said predetermined time, concluding that said last pulse of a current message has already been received.

14. The method of claim 10, wherein step (F) further comprises:
    flagging a new start address in the memory for storage of the value representative of the leading edge of a first pulse in a next pulse train in response to said interrupt signal.

15. The method of claim 10, wherein step (D) further comprises:
    executing a single interrupt source request for each message in a plurality of said pulse trains.

16. The method of claim 10, wherein step (E) further comprises:
    transferring information necessary for deciding an instruction.

17. An apparatus for receiving and processing an electrical signal in the form of a pulse train comprising a plurality of pulses, comprising:
    - a processor;
    - a memory;
    - a first circuit configured to (i) generate a respective value representative of a position of each leading edge and each trailing edge of each pulse in the pulse train, (ii) generate a single interrupt signal following receipt of a current message in the pulse train and (iii) apply said interrupt signal to said processor, wherein said processor is arranged to read the values stored in the memory for decoding said current message in response to both (a) said interrupt signal and (b) a current start address for said current message in said memory; and
    - a second circuit configured to receive each of said values and write said values to said memory.

18. The apparatus according to claim 17, wherein said first circuit is further arranged to generate said single interrupt signal in response to an absence of said pulses during a predetermined time following said current message.

19. The apparatus according to claim 17, wherein said processor is configured to store a new start address for storing a next message in said memory before receipt of said next message.

20. The apparatus according to claim 17, wherein said single interrupt signal is generated based on an absence of said pulses.

* * * * *